United States Patent [19]

Krick et al.

[11] 4,274,964
[45] Jun. 23, 1981

[54] DIALYSATOR

[75] Inventors: Gerd Krick, Bad Homburg; Peter Konang, Frankfurt am Main, both of Fed. Rep. of Germany; Jan-Erik Sigdell, Basel, Switzerland; Klaus Heilmann, Friedrichsdorf, Fed. Rep. of Germany

[73] Assignee: Dr. Eduard Fresenius Chemisch-pharmazeutische Industrie KG, Apparatebau KG, Bad Homburg, Fed. Rep. of Germany

[21] Appl. No.: 65,075

[22] Filed: Aug. 9, 1979

[30] Foreign Application Priority Data

Aug. 18, 1978 [DE] Fed. Rep. of Germany ....... 2836192

[51] Int. Cl.³ ............................................... B01D 31/00
[52] U.S. Cl. ................................ 210/321.3; 156/177; 156/204; 210/346; 210/486
[58] Field of Search ................... 210/321 B, 346, 486, 210/22; 422/48; 264/258; 156/156, 280, 287, 204, 304, 324, 177

[56] References Cited

U.S. PATENT DOCUMENTS 3,522,885  8/1970  Lavender et al. ............... 210/321 B

FOREIGN PATENT DOCUMENTS 2125862  5/1972  Fed. Rep. of Germany ....... 210/321 B Primary Examiner—Frank A. Spear, Jr.
Attorney, Agent, or Firm—W. G. Fasse; D. F. Gould

[57] ABSTRACT

A dialyzer is formed by first placing a film strip into a membrane hose and then simultaneously folding the hose and a netting intermediate layer so that the folds of the hose and the folds of the netting extend crosswise relative to each other in a mutually interlocking manner. The facing ends of the hose layers are then sealed with a curable sealing compound and severed. Then the film strips are withdrawn from the hoses in the so formed package. The resulting product is a dialyzer or hemofilter, depending on the type of membrane hose used, in which the facing ends of the membrane hoses are open for the passage of blood therethrough, after the withdrawal of the film, and in which the netting layers are located between adjacent hoses.

8 Claims, 16 Drawing Figures

DIALYSATOR

BACKGROUND OF THE INVENTION

The invention relates to a method for making a dialyzer, which comprises parallel sections of flat laid membrane hoses.

SUMMARY OF THE INVENTION

Prior art dialyzers of this type have the disadvantage of an unfavorable flow pattern. Thus, it is the object of the invention to construct a dialyzer of the above mentioned type which will permit a better flow pattern while being simple to manufacture.

For achieving this objective there is provided according to the invention that the flat laid membrane hoses which are closed at the ends by a sealing compound, are held in such a manner in the sealing compound that defined gaps for the entry of blood into the inside of the hose are formed, whereas between neighboring membrane hoses there are arranged netting type inserts for defining the spaces for the dialysate.

The invention further solves the problem to manufacture such dialyzers in a manner as simple as possible.

BRIEF FIGURE DESCRIPTION

The invention will be explained, for example, in the following with reference to the drawings, wherein.

DESCRIPTION OF THE PRIOR ART WITH REFERENCE TO FIGS. 1 TO 5 AND DETAILED DESCRIPTION OF PREFERRED EXAMPLE EMBODIMENTS AND OF THE BEST MODE OF THE INVENTION WITH REFERENCE TO FIGS. 6 TO 16

Figure 1:
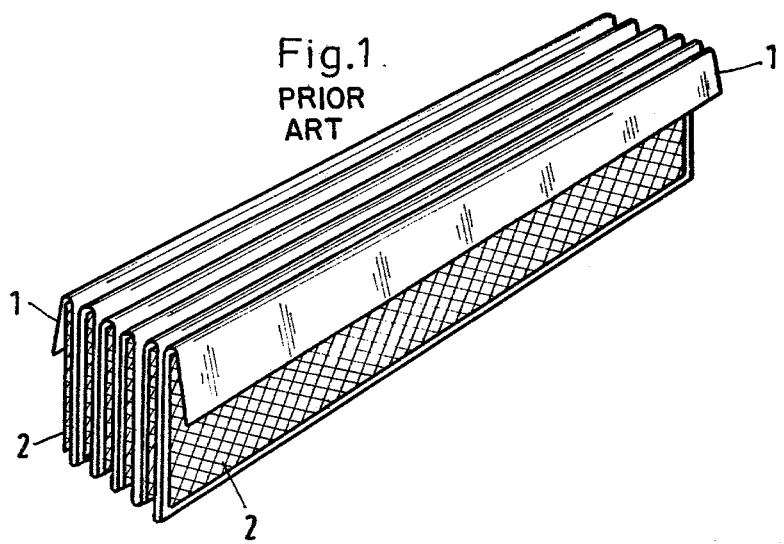
FIGS. 1 to 3 show schematic illustrations of different dialyzers according to the prior art.
Figure 2:
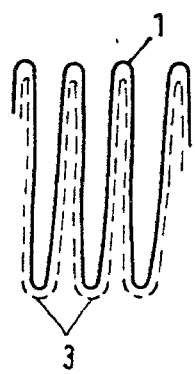
Figure 3:
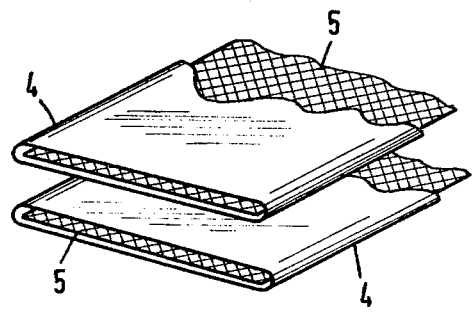

Conventional types of construction of more recent plate dialyzers relate to folded membranes with netting type intermediate layers. Several typical constructions of known dialyzers are shown in FIGS. 1 to 3. FIG. 1 shows the folded membrane 1 with netting strips 2 inserted into the folds from one side. FIG. 2 shows a similar construction with inserted netting folds 3.

FIG. 3 shows a structure with netting strips 5 inserted into flat laid membrane hoses 4.

Figure 4:
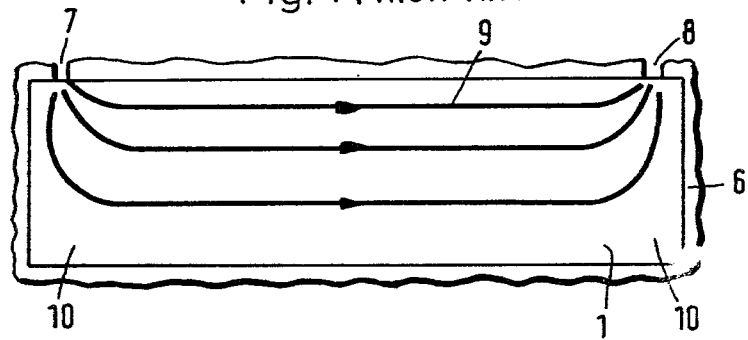
FIGS. 4 and 5 show schematically the flow pattern in prior art dialyzers.

A substantial disadvantage of the structure according to FIG. 1 or FIG. 2 is the blood flow pattern in the membrane folds. The blood flow pattern is shown in FIG. 4. This illustration shows a top plan view of a fold of the membrane 1 which is surrounded by a sealing mass 6 or any other sealing means. However, openings 7 and 8 are arranged in the sealing mass for the entrance and exit of the blood. Further details may be ascertained, among others, from the German Patent Publication No. 2,714,754. The flow lines 9 of the blood are shown above the membrane surface. Evidently, the distribution of the flow pattern is irregular in the cross-section of the membrane fold, whereby "dead corners" 10 result.

A dialyzer which has been optimized with regard to its efficiency resulting in a maximal utilization of the exchange surface, requires a uniformly distributed flow over the membrane surface. In "dead corners" the blood is able to more easily coagulate.

Figure 5:
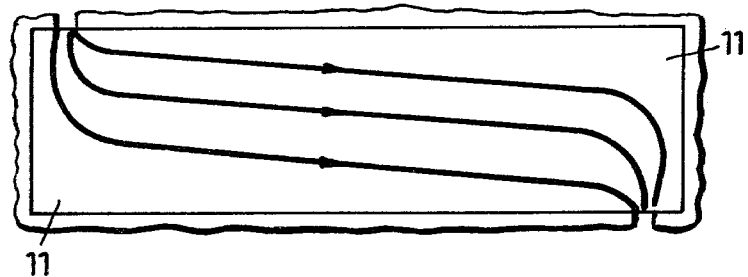

The structure according to FIG. 3 is somewhat more favorable in this respect. However, even in FIG. 3 a nonuniform flow velocity as well as "dead corners" 11 are generally present. In this structure passage openings for the blood are arranged diagonally opposite each other and the resulting flow pattern is shown in FIG. 5.

In all these structures the dialysate is conducted through the netting intermediate layers.

Figure 6:
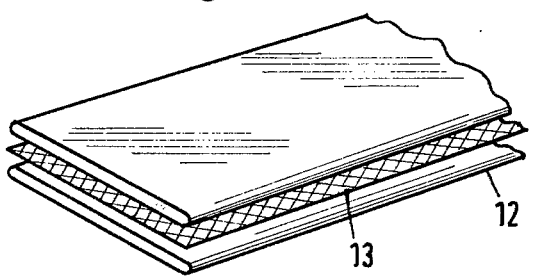
FIG. 6 is a schematic structure of a dialyzer according to the invention.

Thus, a more advantageous arrangement would be the one shown in FIG. 6. In this embodiment of the invention the blood flows just inside the flat laid membrane hoses 12 and the netting intermediate layers 13 are located between the hoses. Blood flow patterns having an S- or a U-shape are avoided and thus "dead corners" are eliminated. In the drawings only two hose membranes 12 and one netting intermediate layer 13 are drawn. In practice, a dialyzer of this type would have to be constructed of a plurality of hose membranes 12 and intermediate layers 13.

The arrangement according to FIG. 3 is not suitable for this type of operation because the netting, which keeps the inner space of the flat laid hose open, is unsuitable for the throughflow by the blood due to its tendency to coagulate and frequently also due to hemolysis.

A displacement of the netting intermediate layer 5 between the hose membranes 3 as shown in FIG. 6 is not such an obvious further development as may appear at first glance, because the embodiment of FIG. 6 may be realized only by special production techniques which are part of the present invention. In order to explain this, the further arrangement of the dialyzer construction according to FIG. 3 which is known as such will first be described.

Figure 7:
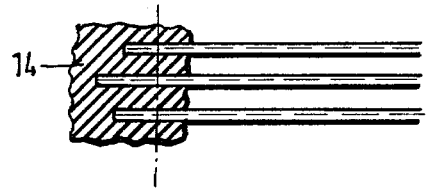
FIG. 7 is a sectional view for explaining the manufacturing method.

A dialyzer according to FIG. 3 is produced of membrane hose sections 4 stacked one on top of the other with inserted netting strips 5. For sealing the blood or dialysate spaces outwardly and relative to one another, the package of membranes and netting which results from the stacking, is glued tight or sealed at least initially at the end sections thereof by a sealing means so that the membrane hoses are connected to one another in these zones as indicated in FIG. 7. FIG. 7 illustrates an end section including sealing means 14. In order to produce at this end section a plane end surface for the entrance of the dialysate, the package is cut through along the dash-dotted line. Thus, the inner spaces of the membrane hoses which are held apart by the netting, become accessible in the plane of the cut. The package may, for example, also be produced of a length of membrane hose with a netting insert, whereby folds are located in the end zone, namely, outside the dash-dotted line in FIG. 7. These folds are then cut off during the severing and the end result is the same as in the example of the stacked sections just described.

The so connected and cut out package is then inserted into a housing and the longitudinal sides are provided with further sealing means so that blood spaces result as shown in FIG. 5 which are connected outwardly through openings in the sealing means.

A reversal of this principle in order to obtain an arrangement according to FIG. 6 is not possible without more because due to the absence of netting intermediate layers inside the hose, the hose sections remain completely pressed flat together when the connection according to FIG. 7 is made so that the hoses do not permit any entry of blood in the sectional zone. Incidentally, such netting intermediate layers may actually not be present inside the hoses during blood flow therethrough. In order to prevent flattening of the hose sections, special steps must be taken for the keeping the hose sections open during the application of a sealing mass. These steps are an essential part of the present invention. For example, an intermediate layer holding the hoses apart may be left temporarily inside each hose section and the intermediate layers are subsequently removed after the severing. A method for this purpose will first be described.

Figure 8:
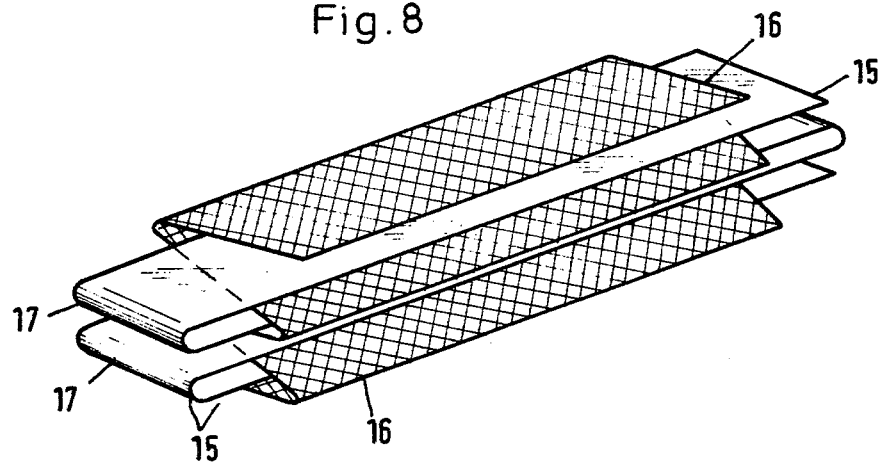
FIG. 8 is a schematic illustration of a basic package for manufacturing a dialyzer according to the invention.

According to the invention, a film strip of polyethylene or similar relatively smooth material, that is, a material having a low friction is inserted into a length of hose membrane 15. The hose length 15 in a flat condition with the film strip inside of the hose length is folded together with a netting piece 16 as shown in FIG. 8. Thus, the netting sections come to lie between the hose sections.

Figure 9:
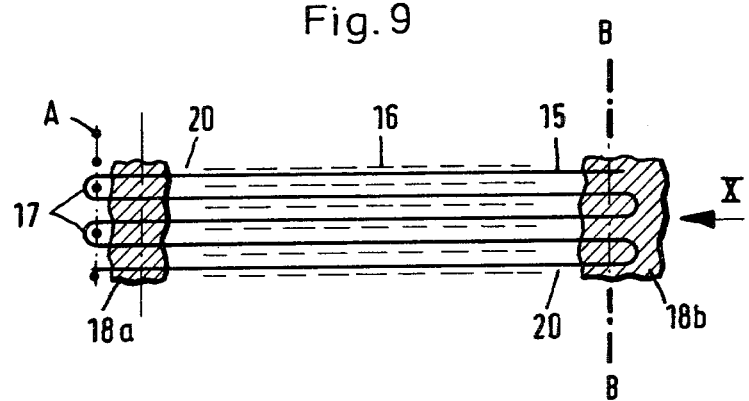
FIG. 9 is a sectional view of a dialyzer during its manufacturing.
Figure 10:
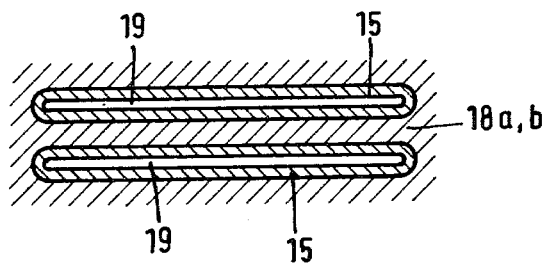
FIG. 10 is a sectional view along the section line B—B and in the direction of the arrow X as shown in FIG. 9.
Figure 11:
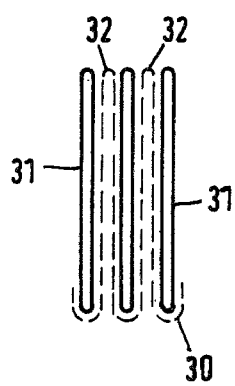
FIG. 11 is a schematic facing view of a basic package for a modified manufacturing method.

The so formed package of flat laid folded hose 15 with an inserted film strip therein and of crosswise folded-in netting 16 is now sealed at the end with a pourable resin in such a manner that the resin leaves free the folding crease or folded end 17 at one end of the membrane hose. In order to achieve this, several methods known as such are possible. For example, the respective end may stand in a sealing mold facing downwardly whereby the mold is first filled with a suitable liquid to such an extent that the fold crease or end 17 is covered and the sealing mass is then placed on top of the liquid. The sealed package may then look as shown in FIG. 9, whereby the folding creases or ends 17 are not covered by the sealing mass at one end as shown in FIG. 8. The sealing mass 18 holds the package together.

In order to expose the end openings of the hose sections, the package is now first cut through in the zone of the sealing mass 18b along the dash-dotted line. Thereafter, the folds 17 are cut open and the film located inside the hose may be pulled out. The respective folded ends 17 at the other end have already been cut off.

Thereafter the severing is also performed in the sealing mass 18a along the dash-dotted line. The cut surface then has the appearance shown in FIG. 10 wherein the hose cross-section 15 exhibits defined, gap shaped openings 19 which have the same width as the thickness of the pulled out film. Blood may now be supplied into the hoses at these cut surfaces.

For facilitating the withdrawal of the film inserts, the exposed folded ends 17 may reach around a comb type structure A which grips into the folds as shown in FIG. 8. If now the membrane is moistened with a suitable liquid at these folds, its tensile strength is substantially reduced and the insert film may be withdrawn with the aid of the comb type structure without a preceding cutting open of the folds 17. Water would be a suitable liquid where the membranes are made of cellulose. The membrane then rips open by the pull of the comb at these points. The ripped membrane sections are then cut off and removed, namely, when the sealing mass 18a is cut through.

The further procedure in the manufacturing follows methods known as such. However, the present type of production offers the additional advantage that the netting inserts may be kept at a suitable spacing from the sealing mass so that the gaps 20 (FIG. 9) result. These gaps between the sealing mass and the netting facilitate the lateral distribution of the dialysate flow at these locations.

The filling of the ends of the package comprising the membrane hose and the intermediate netting layers may, if the housing is to be constructed, also take place after insertion of the package into the housing whereby the trimming takes place at zones of sealing compound extending out of the housing as is known as such for hollow fiber dialyzers. The end zones are then closed by means of additional housing components.

A further method for maintaining the membrane gaps will now be described.

The folded package comprising membrane hose sections and intermediate layers is produced as described above, however, without inserts inside the flat laid hose. After folding the package the hose is blown up by means of a gas, for example, air under suitable pressure. Thereafter, the procedure is substantially the same as described above with reference to the example including a hose insert. However, now the folding creases do not have to be left free at one end. Rather, both ends may now be drawn out beyond the folds, and the pre-cutting is also obviated. The two ends must be cut plane to such an extent that the hose ends thus made accessible form gap shaped entrance openings for the blood.

The blowing-up may be accomplished before or after the application of the sealing mass but prior to the hardening of the mass.

The trimmed package, as before, is inserted into a housing and further processed or it may have been embedded in a housing member to which merely the end pieces are to be attached as has also been described above.

The type of folding the hose and the netting crosswise and into one another as shown in FIG. 8 constitutes but one possibility for the production of the package. The folds of the netting 16 may be layed in such a manner that they reach, similarly to FIG. 2, in the hose layers as is shown in the sectional view of FIG. 11. Further, the intermediate layers may comprise die-stamped or precut strips. The netting itself may be woven, pressed, stamped, injection molded, or extruded, whereby the latter is accomplished by special methods known as such for the extrusion of the netting, for example, with folds having a diamond shape. Any suitable manner may be used to produce the netting.

When sealing a blown up hose membrane it is necessary to provide intermediate layers also in the zone of the sealing mass or sealer in order to limit the expansion of the hose and thus to define the gap.

Figure 12:
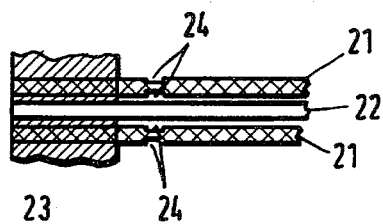
FIG. 12 is a sectional view of a further modified example embodiment.
Figure 13:
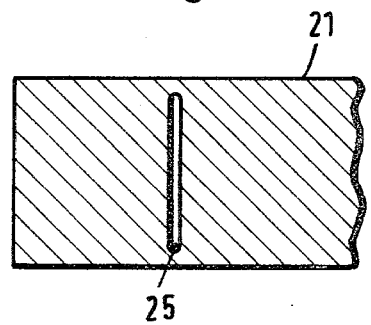
FIG. 13 is a top plan view onto a netting intermediate layer.
Figure 14:
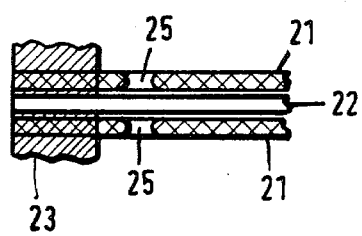
FIG. 14 is a sectional view of a further modified example embodiment.

In order to improve the lateral distribution of the dialysate in the netting portions, cross-grooves may be provided on the netting portions at the ends of the dialysate space. These cross grooves may be produced as indentations 24 in the netting as shown in FIG. 12, which shows the netting insert 21 in a longitudinal section through the package. A flat laid hose membrane is shown at 22 and a sealing zone 23 is shown at one end. The indentations or grooves 24 may be produced by weaving techniques through the insertion of a thread gap. Where the netting is injection molded or pressed or produced in other similar ways, the tool will correspondingly be constructed for the making of the grooves. Where the netting is extruded, an attachment vice may be used or the grooves may be impressed in the finished netting in a hot or cold condition. A further possibility is seen in providing the netting members 21 with longitudinally extending holes 25 as shown in FIG. 13. After the embedding and trimming a longitudinal section is obtained as seen in FIG. 14.

Figure 15:
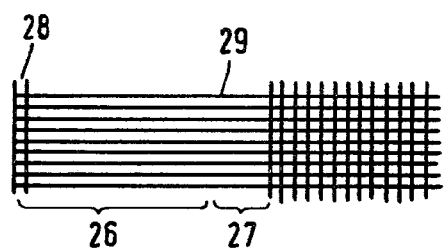
FIG. 15 is a top plan view onto another netting intermediate layer.

When a woven netting is used it may be advantageous for the embedding or sealing if the grooves 24 (FIG. 12) produced by a larger thread spacing which extends to the ends of the netting. In this manner a netting structure is obtained as illustrated in FIG. 15 which comprises theads 29 extending only longitudinally in the zone 26 of the embedding or sealing mass and in an extension 27 thereof provided for the lateral distribution of the dialysate. Thus, the application of the embedding or sealing mass is facilitated in the zone 26. Border threads 28 hold the longitudinal threads 29 together and fall into the sealing mass portion to be severed.

Figure 16:
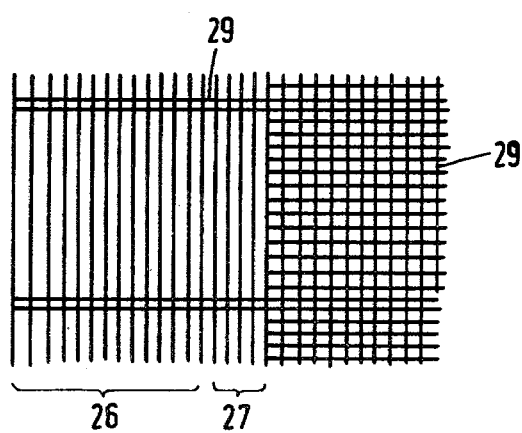
FIG. 16 is a top plan view corresponding to FIG. 15 for a further example embodiment with a netting intermediate layer.

Similarly, a structure as shown in FIG. 16 is advantageous. In this embodiment the longitudinal threads 29 extend to the end only in the zones to be folded, whereas otherwise they stop with a spacing from the end. When the netting strips are used only the longitudinal threads are extended to the end at the border.

Similar arrangements may be worked into nettings produced by injection molding, extruding, and so forth.

Each type of construction of the dialyzer may also be used as a hemofilter provided that a membrane is used suitable for this purpose.

Although the invention has been described with reference to specific example embodiments, it will be appreciated, that it is intended, to cover all modifications and equivalents within the scope of the appended claims.

We claim:

1. A method for producing a multilayer dialyzer having folded layers of a flattened membrane hose alternating with layers of netting wherein the folded membrane hose layers are embedded in a sealer and then opened at the creases to provide hose sections with open ends held together by said sealer, said open ends providing access for a liquid into said hose sections, and wherein said netting layers are interposed between adjacent hose sections which define spaces for another liquid, comprising the following steps:
    (a) providing a substantially continuous length of said membrane hose with spacer means inside the hose to space the hose walls from each other by said spacer means,
    (b) providing a substantially continuous length of said netting,
    (c) simultaneously folding said membrane hose with the spacer means therein and said netting in the directions which cross each other (15, 16) whereby said alternating arrangement of hose sections and netting layers is formed and whereby the hose sections and netting layers are located in a mutually interlocking manner,
    (d) providing the hose ends with said sealer and curing the sealer,
    (e) opening the hose sections to provide said open hose ends, and
    (f) removing said spacer means out of the open hose ends.

2. The method of claim 1, characterized in that the netting (30) is inserted from one side between the membrane hose folds (31) so that said netting forms double folds (32) between each of two membrane hose sections.

3. The method of claims 1 or 2, wherein said spacer means is provided by blowing-up the hose with a gas or by expanding the hose with a liquid, whereby the blowing-up or the expanding may take place prior or during the closing with the sealer (when the sealing compound is still soft), and wherein the netting type intermediate layer defines the size of the gaps by limiting the expansion.

4. The method of claim 1, wherein the netting layers have cross grooves (24) or cross holes (25).

5. The method of claim 1, wherein the netting layers have substantially or entirely a longitudinal structure in the zone of the sealer and in an adjacent zone, without any or with a few cross bars or cross threads.

6. The method of claim 1, wherein the netting layers have substantially or entirely a cross structure in the zone of the sealer and in an adjacent zone, without any or with a few longitudinal bars or longitudinal threads.

7. A dialyzer produced by the steps of claim 1.

8. The method of claim 1, comprising leaving said membrane creases at the folded hose ends free of sealer at least at one end of the folded membrane hose layers when the ends are closed with said sealer severing through the sealer at the opposite end of the folded membrane hose layers, and pulling said spacer means out of said membrane hose layers at said one end, whereby the membrane creases at said one end are opened due to said pulling or by cutting prior to the pulling.

* * * * *